United States Patent [19]

Kato

[11] Patent Number: 5,357,296
[45] Date of Patent: Oct. 18, 1994

[54] CAMERA WITH A BUILT-IN MAGNETIC HEAD

[75] Inventor: Minoru Kato, Kawasaki, Japan

[73] Assignee: Nikon Corporation, Tokyo, Japan

[21] Appl. No.: 150,284

[22] Filed: Nov. 10, 1993

Related U.S. Application Data

[63] Continuation of Ser. No. 879,922, May 8, 1992, abandoned.

[30] Foreign Application Priority Data

May 14, 1991 [JP] Japan ................................ 3-138523

[51] Int. Cl.$^5$ ............................................. G03B 29/00
[52] U.S. Cl. ...................................... 354/76; 354/106
[58] Field of Search ........................... 354/75, 76, 106; 352/27

[56] References Cited

U.S. PATENT DOCUMENTS

| | | | |
|---|---|---|---|
| 4,933,780 | 6/1990 | Wash et al. | 354/76 |
| 5,006,873 | 4/1991 | Wash | 354/106 |
| 5,016,030 | 5/1991 | Dwyer et al. | 354/76 |
| 5,021,820 | 6/1991 | Robison et al. | 355/40 |
| 5,028,940 | 7/1991 | Pearson | 354/75 |
| 5,130,745 | 7/1992 | Cloutier et al. | 354/76 |

*Primary Examiner*—Monroe H. Hayes
*Attorney, Agent, or Firm*—Shapiro & Shapiro

[57] ABSTRACT

The size along an optical axis of a camera with a built-in magnetic head is reduced by arranging a magnetic head and a pad to be used for writing magnetic information radially externally of a bodytube, the pad being accommodated in a notch formed in the camera body so as to permit the bodytube to be retracted to a position close to a film.

4 Claims, 5 Drawing Sheets

CAMERA WITH A BUILT-IN MAGNETIC HEAD

This is a continuation of application Ser. No. 879,922 filed May 8, 1992, now abandoned.

BACKGROUND OF THE INVENTION

1. Field of the Invention

The present invention relates to a camera with a built-in magnetic head which can write magnetic information (for example, date or day of week) on a film.

2. Related Background Art

A zoom camera is known in which a drive tube is rotatably supported by a camera body, a bodytube which contains a photographing lens is housed in the drive tube by screw engagement, and the bodytube is extended or retracted, relative to the camera body as the drive tube is rotated.

When magnetic information is recorded on a magnetic track of a film by the magnetic head, it is necessary to pinch the film by the magnetic head and a pad. Thus, the magnetic head and the pad are arranged on the opposite sides of the film. A space to accommodate the pad is provided behind the bodytube at the retracted end, and the magnetic head is arranged to face the pad with the film interposed therebetween.

In such a prior art camera with a built-in magnetic head, the bodytube must be arranged forward by a distance corresponding to the thickness of the pad because the pad is arranged behind the bodytube. As a result, the camera is of large size along an optical axis.

SUMMARY OF THE INVENTION

It is an object of the present invention to reduce the size, along an optical axis, of a camera with a built-in magnetic head to be used for writing magnetic information by positioning the magnetic head and a pad radially externally of an outer periphery of a bodytube.

Referring to FIG. 1 which shows one embodiment of the present invention, a camera with a built-in magnetic head of the present invention comprises a drive tube 1 rotatably supported by a camera body 3, 23, a bodytube 4 which is housed in the drive tube 1, extendable and retractable relative to the camera body 3, 23 by the rotation of the drive tube 1 and includes a photographing lens therein, a magnetic head 35 adapted to be abutted against a magnetic track formed on a film 2 to write magnetic information on the film 2 and a pad 26 to pinch the film 2 with the magnetic head 35.

A notch 3a, 23c is formed at a portion of the camera body 3, 23 outside from an outer periphery of the bodytube, and one of the magnetic head 35 and the pad 26 is housed in the notch 3a, 23c.

As the drive tube 1 is rotated, the bodytube 4 which is housed in the drive tube 1 by screw engagement extends or retracts relative to the camera body 3, 23. On the other hand, since the magnetic head 35 or the pad 26 is housed in the notch 3a, 23c which is disposed radially externally of the outer periphery of the bodytube, the bodytube 4 can be retracted to the vicinity of the film 2 without regard to the magnetic head 35 or the pad 26.

While the illustrative embodiment is used to facilitate the explanation of the present invention, it will be appreciated that the present invention is not limited to this embodiment.

In accordance with the present invention, the notch is formed at the portion of the camera body which is located externally of the outer periphery of the bodytube and one of the magnetic head and the pad is housed in the notch. Accordingly, the bodytube can be retracted to the vicinity of the film without regard to the magnetic head and the pad, and the size along the optical axis of the camera with the built-in magnetic head can be reduced.

DETAILED DESCRIPTION OF THE PREFERRED EMBODIMENTS

One embodiment of the present invention is now explained with reference to FIGS. 1 to 5.

Figure 1:
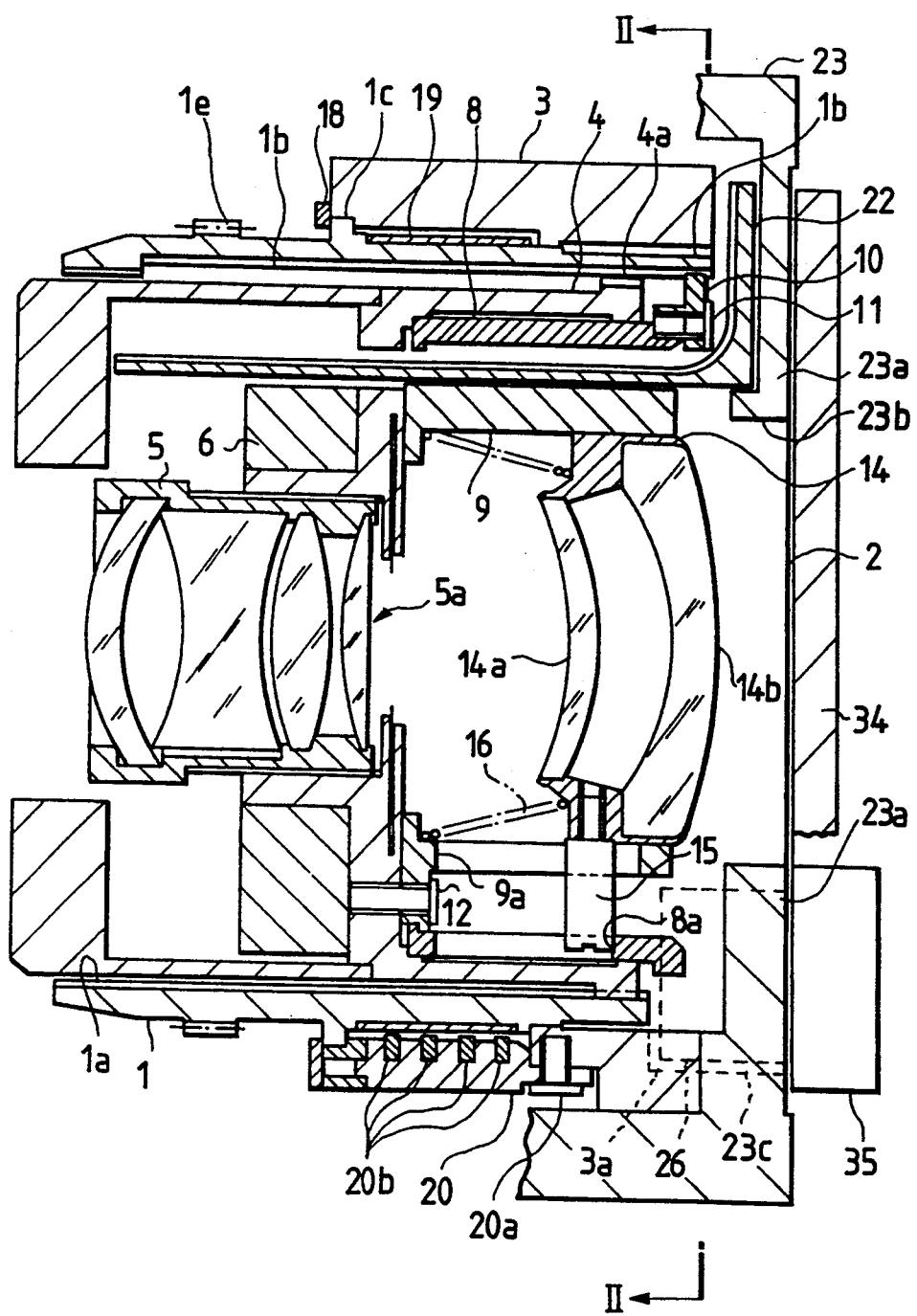
FIG. 1 shows an embodiment of a camera with a built-in magnetic head in accordance with the present invention and shows a sectional view with a photographing lens at a retracted position.
Figure 2:
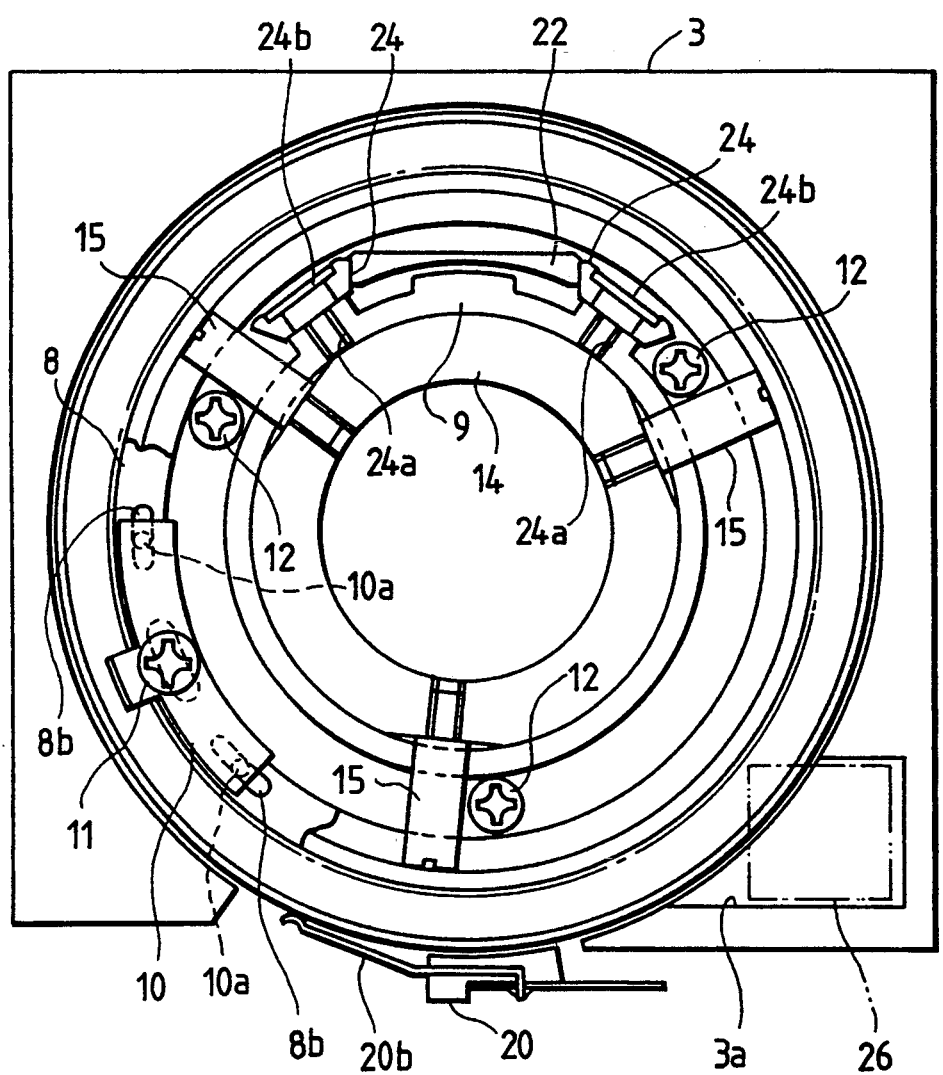
FIG. 2 shows a sectional view taken along line II—II of FIG. 1.
Figure 3:
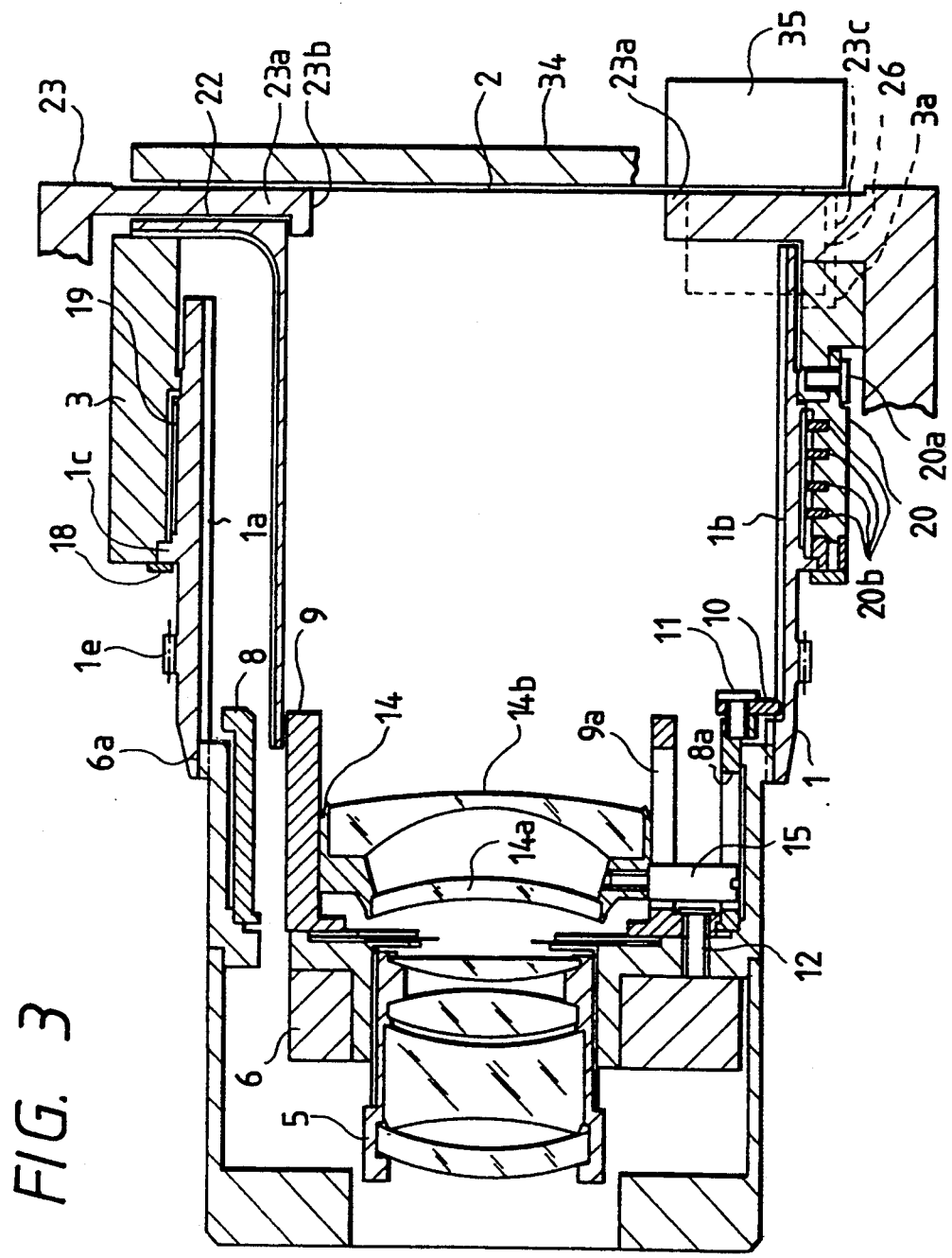
FIG. 3 shows an embodiment of a camera with a built-in magnetic head in accordance with the present invention and shows a sectional view with a photographing lens at a zoom end.

FIGS. 1 and 3 show longitudinal sectional views including an optical axis of a lens of a camera, and they show a retracted position at which the lens is driven in and a zoom end position at which the lens is driven out, respectively, and FIG. 2 is shows a sectional view taken along a line II—II of FIG. 1 to view a lens drive mechanism from the rear along the optical axis the section being taken by cutting at a rear lens chamber which includes a rear guide pin. In the drawings, numeral 1 denotes a cylindrical drive tube which has a helicoid 1a formed on an inner periphery thereof. The drive tube 1 is housed in a cylindrical space formed in a front body 3, and it is rotatably attached to the front body 3 by pinching a ring-shaped band 1c projecting from the periphery thereof between a drive tube retainer 18 and the front body 3. Numeral 18a denotes a bolt hole formed in the drive tube retainer 18. The drive tube retainer 18 is screw-engaged with the front body 3 by a bolt 18b loosely fitted to the bolt hole 18a. A bodytube 4 is housed in the drive tube 1 and a helicoid 4a formed on an outer periphery of the bodytube 4 screw-engaged with the helicoid 1a formed on the inner periphery of the drive tube 1. A front lens holding tube 5 is housed in the front interior of the bodytube 4 and a shutter 6 is housed in a front exterior.

Figure 4:
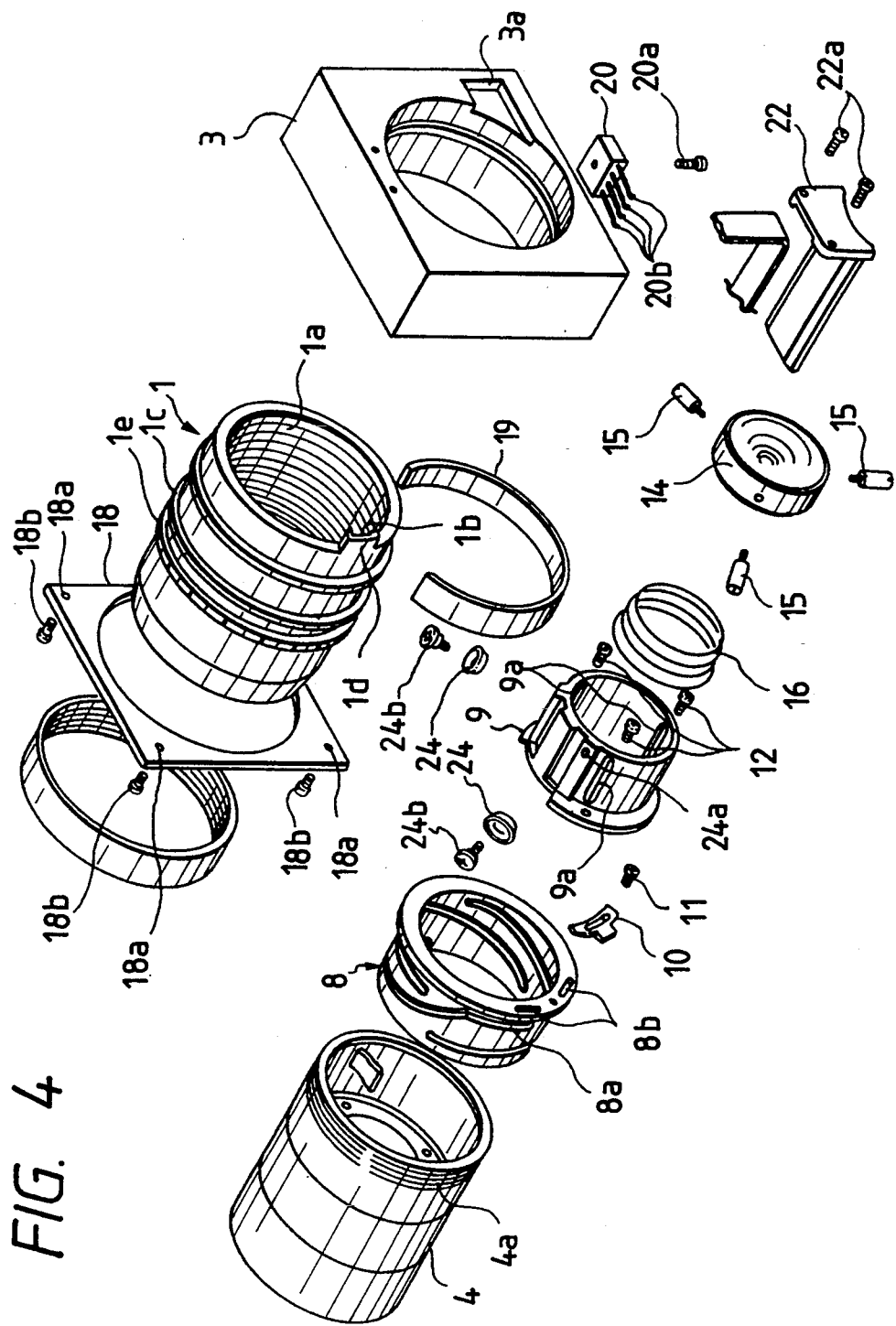
FIG. 4 shows a perspective view of the development in front of the line II—II section of FIG. 1.

A rear cam ring 8 is rotatably arranged in the interior of the bodytube 4 and in the exterior of a rear linear guide tube 9. As shown in FIG. 4, three cam grooves 8a which extend peripherally obliquely are formed in a peripheral wall of the rear cam ring 8 and two slots 8b are formed in a rear plane. The slots 8b form guides for two round projections 10a formed on a clutch 10 as shown in FIG. 2 when the clutch 10 is joined to the plane.

The clutch 10 is screw-engaged to the rear cam ring 8 by a clutch retaining bolt 11 and the position of the clutch 10 is adjustable within the range of the slot 8b of the rear cam ring 8 by releasing the clutch retaining bolt 11. The clutch 10 slidably engages with the linear groove 1b formed in the drive tube 1. The rear linear guide 9 is screw-engaged to the bodytube 4 by linear guide tube retaining bolt 12, and integral therewith.

Numeral 14 denotes a rear lens holding tube for holding a lens 14a and a lens 14b. As shown in FIG. 4, three rear guide pins 15 radially extend from the outer periphery of the holding tube 14 at equidistant points along the circumference. The three rear guide pins 15 extend through the cam groove 8a formed in the rear cam ring 8 and the linear groove 9a formed in the rear linear guide tube 9 and function as cam followers. A rear backlash absorbing spring 16 pushes the rear guide pins 15 toward the rear of the wall of the cam groove 8a to prevent the backlash of the rear lens chamber along the optical axis.

A flexible printed circuit board (FPC) 19 which forms an encoder is applied to the outer periphery of the drive tube 1 with an encoder pattern (not shown) which forms electrical contacts faced to the outside. An encoder brush 20 is screw-engaged to the front body 3 by an encoder brush retaining bolt 20a. Contacts 20b at the end of the encoder brush 20 contact the encoder FPC 19 attached to the drive tube 1 through a notch at the bottom of the front body 3. A position of the lens is recognized by the encoder 19 to determine a magnification for photographing.

A linear key 22 has parallel side planes and flat and elongated shape, and a bent portion at one end thereof is screw-engaged to the front body 3 by a linear key retaining bolt 22a. The linear key 22 is a guide member which extends between the rear cam ring 8 and the rear linear guide tube 9 beyond the rear body 23 along the optical axis. The linear key 22 is on a smooth plane on the rear linear guide tube 9 as shown in FIG. 2 and is pinched between a pair of rolls 24b which are arranged on the rear linear guide tube 9. The rolls 24 have conical planes on the sides thereof and they are rotatably screwed to roll bolt holes 24a formed in each of two belt-shaped portions of the rear linear guide tube 9, by roll bolts 24b. The pair of rolls 24 tangentially contact the parallel side planes of the linear key 22.

A notch 3a is formed at a portion of the front body 3 which is located radially externally of the outer periphery of the bodytube 4 as shown in FIG. 2, and basically the front half of a pad 26 is housed therein. A projection 1d on the rear end of the drive tube 1 shown in FIG. 4 rotates within a range of non-interference with the pad 26. The linear groove 1b is also formed in the inner periphery of the projection 1d.

Figure 5:
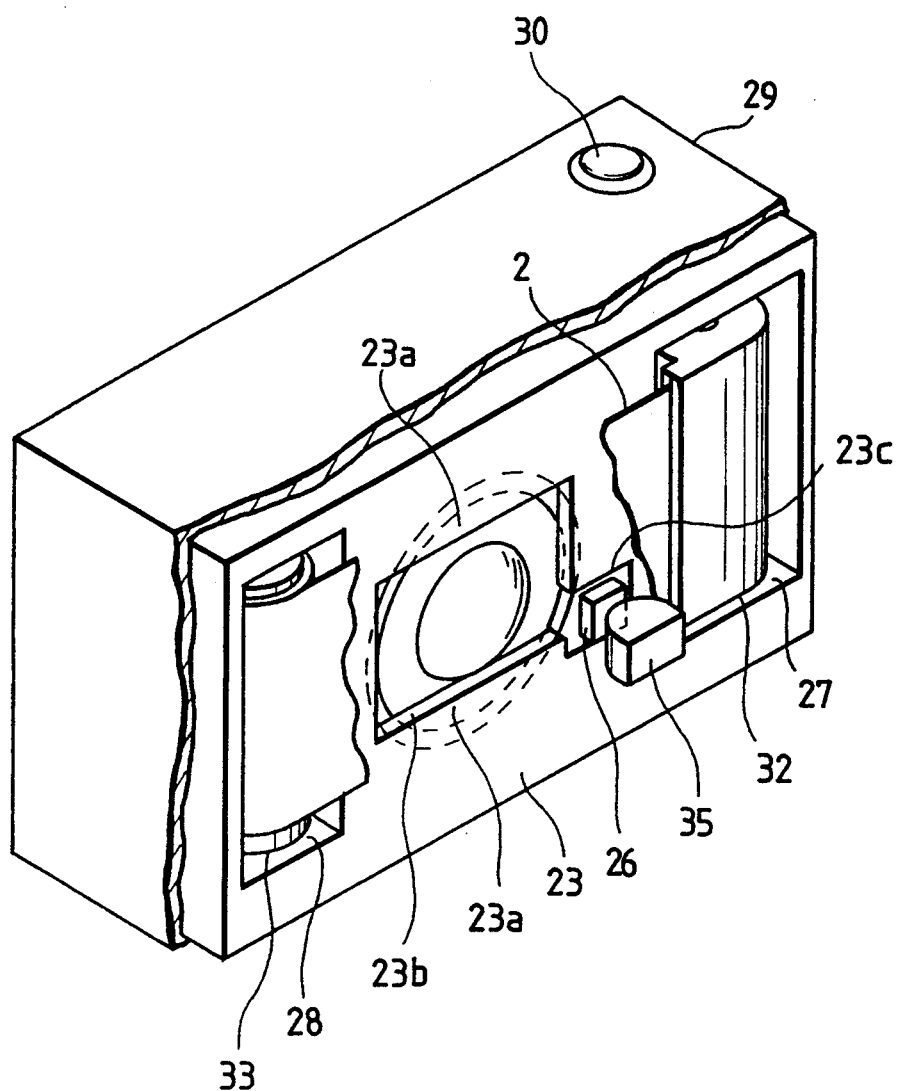
FIG. 5 shows a cut-away perspective view of a rear body of FIG. 1.

As shown in FIG. 5, a cartridge chamber 27 and a spool chamber 28 are formed on the left and right of the rear body 23. The rear body 23 is covered by a cover 29 on which a release button 30 is formed.

The rear body 23 between the cartridge chamber 27 and the spool chamber 28 has a rail member 23a for slidably supporting an exposure plane of the film 2, and an aperture 23b is formed on the optical axis of the member 23a. A notch 23c which is continuous to the aperture 23b is formed at a portion of the rear body 23 which faces the notch 3a of the front body 3, as shown in FIGS. 1, 3 and 5. The notch 23c houses basically the rear half of the pad 26 therein. Thus, the pad 26 is arranged radially externally of the outer periphery of the bodytube 4.

Numeral 32 denotes a cartridge mounted in the cartridge chamber 27, the film 2 taken out of the cartridge 32 runs on the rail member 23a and is taken up by a spool 33 mounted in the spool chamber 28. The film 2 is pressed to the rail member 23a by a spring (not shown) through a pressure plate 34 shown in FIGS. 1 and 3.

The magnetic head 35 is arranged behind the pad 26 and it is abutted against a magnetic track formed on the film 2 by a spring (not shown). In the magnetic recording, the film 2 is fed while the film 2 is pinched between the pad 26 and the magnetic head 35.

An operation of the embodiment is now explained.

As a drive gear (not shown) coupled to a motor (not shown) mounted in the camera body is rotated, a gear 1e receives a driving force from the drive gear so that the drive tube 1 is rotated. The helicoid 4a of the bodytube 4 is screw-engaged with the helicoid 1a of the drive tube 1 and the rotational movement of the bodytube 4 is restricted by the guide by the linear key 22. Accordingly, as the drive tube 1 is rotated, the bodytube 4 is linearly moved along the optical axis. As the drive tube 1 is rotated, the rear cam ring 8 is rotated with the drive tube 1 through the clutch 10 which is fitted to the linear groove 1b and is screw-engaged to the rear cam ring 8. Since the rotation of the rear linear guide tube 9 is restricted by the linear key 22 which is held by the pair of rolls 24, the rear linear guide tube 9 is linearly moved with the bodytube 4.

As the rear cam ring 8 is rotated, the rotational movement is transmitted to the rear lens holding tube 14 through the rear guide pin 15 which extends through the cam groove 8a, but since the rotational movement of the rear guide pin 15 is restricted because it engages with the linear groove 9a formed in the rear guide tube 9, the rear lens holding tube 14 is linearly moved along the optical axis. The rear lens holding tube 14 makes a predetermined relative-linear movement to the rear linear guide tube 9 along the movement of the cam groove 8a so that the rear lenses 14a and 14b are driven to keep a predetermined interval to the front lens 5a which makes the linear movement with the bodytube 4. In this manner, zooming is attained. Since the rear lens holding frame 14 is always pressed to the rear wall of the cam groove 8a by the rear backlash absorbing spring 16, the fitting between the cam groove 8a and the rear guide pin 15 may be done with a sufficient margin.

When the film is wound up, the film is pinched by the pad 26 and the magnetic head 35 and magnetic information such as year, month, day or day of week is written on the magnetic track by the magnetic head 35.

As the bodytube 4 is linearly moved with the rear linear guide tube 9 and retracted to its innermost position, the bodytube 4 can be moved close to the film 2 without regard to the position of the pad 26 because the pad 26 is located radially externally of the outer periphery of the bodytube 4. As a result, the bodytube can be moved closer to the film 2 than was possible in the prior art, and the size of the camera with the built-in magnetic head 35 can thus be reduced along the optical axis.

In the present embodiment, the front body 3 and the rear body 23 form the camera body.

What is claimed is:

1. A camera with a built-in magnetic head, comprising:

a camera body having a film-cartridge receiving chamber at one side thereof and a spool chamber at another side thereof;

a drive tube rotatably supported by the camera body;

a bodytube housed in said drive tube and incorporating a photographing lens therein;

said bodytube being extendable and retractable relative to the camera body by rotation of the drive tube;

a magnetic head adapted to be abutted against a magnetic track formed on the film for writing magnetic information on the film;

a pad for pinching the film with the magnetic head; and a notch formed at a portion of the camera body which is located between said film-cartridge receiving chamber and said spool chamber and laterally outwardly of the outer periphery of the bodytube, and housing one of the magnetic head and the pad such that the entirety of said one of the magnetic head and the pad within said notch is disposed laterally outwardly of the outer periphery of the bodytube.

2. A camera according to claim 1, wherein said notch is continuous with an aperture defining an exposure area for a frame of the film.

3. A camera with a built-in magnetic head, comprising:

a camera body having a film-cartridge receiving chamber at one side thereof and a spool chamber at another side thereof;

a drive tube rotatably supported by the camera body;

a bodytube housed in said drive tube and incorporating a photographing lens therein;

said bodytube being extendable and retractable relative to the camera body by rotation of the drive tube;

a magnetic head and a pad for pinching a film therebetween; and a notch formed at a portion of the camera body which is located between said film-cartridge receiving chamber and said spool chamber and laterally outwardly of the outer periphery of the bodytube, and housing one of the magnetic head and the pad, with the entirety of said one of the magnetic head and the pad being disposed laterally outwardly of the outer periphery of the bodytube.

4. A camera according to claim 3, wherein said notch is continuous with an aperture defining an exposure area for a frame of the film.

* * * * *